United States Patent [19]

Kazyak

[11] Patent Number: 5,320,403
[45] Date of Patent: Jun. 14, 1994

[54] SPACE FRAME TORQUE BOX

[75] Inventor: Lawrence P. Kazyak, Novi, Mich.

[73] Assignee: Ford Motor Company, Dearborn, Mich.

[21] Appl. No.: 44,564

[22] Filed: Apr. 7, 1993

Related U.S. Application Data

[63] Continuation of Ser. No. 875,484, Apr. 29, 1992, abandoned.

[51] Int. Cl.⁵ .............................................. B60R 27/00
[52] U.S. Cl. ...................................... 296/203; 296/29; 296/204; 296/205; 403/403; 403/205; 403/391
[58] Field of Search ................. 296/29, 203, 205, 204, 296/194, 209, 197; 403/403, 205, 391; 52/280, 284, 282

[56] References Cited

U.S. PATENT DOCUMENTS

| | | | |
|---|---|---|---|
| 2,767,876 | 10/1956 | Mautner | 52/280 X |
| 2,964,331 | 12/1960 | Sherman . | |
| 3,075,802 | 1/1963 | Lowe | 296/29 |
| 3,162,478 | 12/1964 | Richards . | |
| 3,349,533 | 10/1967 | Gregoire | 52/282 X |
| 3,472,301 | 10/1969 | Pearce, Jr. . | |
| 4,205,844 | 6/1980 | Gombas . | |
| 4,230,361 | 10/1980 | Nachbur et al. . | |
| 4,471,519 | 9/1984 | Capello et al. . | |
| 4,477,201 | 10/1984 | Yoshiyuji | 403/403 X |
| 4,618,163 | 10/1986 | Hasler et al. . | |
| 4,660,345 | 4/1987 | Browning . | |
| 4,673,205 | 6/1987 | Drewek . | |
| 4,676,545 | 6/1987 | Bonfilio et al. | 296/203 X |
| 4,714,367 | 12/1987 | Baus | 403/403 X |
| 4,726,166 | 2/1988 | DeRees . | |
| 4,789,199 | 12/1988 | Komatsu . | |
| 4,807,925 | 2/1989 | Sakamoto et al. . | |
| 4,887,862 | 12/1989 | Bassi . | |
| 4,912,826 | 4/1990 | Dixon et al. . | |
| 4,976,490 | 12/1990 | Gentle . | |
| 5,042,395 | 8/1991 | Wackerle et al. | 52/282 X |
| 5,052,741 | 10/1991 | Brown et al. | 52/282 X |
| 5,085,485 | 2/1992 | Wurl | 296/204 |

FOREIGN PATENT DOCUMENTS

| | | | |
|---|---|---|---|
| 0061994 | 2/1982 | European Pat. Off. . | |
| 3224166 | 12/1983 | Fed. Rep. of Germany | 403/205 |
| 3714661 | 11/1988 | Fed. Rep. of Germany | 52/280 |
| WO8704679 | 8/1987 | PCT Int'l Appl. . | |
| 2037583 | 7/1980 | United Kingdom | 52/282 |

OTHER PUBLICATIONS

"Light Alloys In Car Construction-The Case For Their Wider Use", *The Autocar*, vol. XCV, Issue 2833, pp. 189, 190, Publication Date, Feb. 17, 1950.

Primary Examiner—Dennis H. Pedder
Assistant Examiner—Gary C. Hoge
Attorney, Agent, or Firm—Daniel M. Stock; Roger L. May

[57] ABSTRACT

A torque box for a space frame on an automotive vehicle having at least a pair of spaced vertically extending structural members includes an inner panel, and an outer panel spaced from the inner panel and substantially parallel thereto. The torque box includes a plurality of interior panels extending between and interconnecting the inner and outer panels. The inner and outer panels and interior panels cooperate to form a spaced ends which are secured to the structural members.

14 Claims, 2 Drawing Sheets

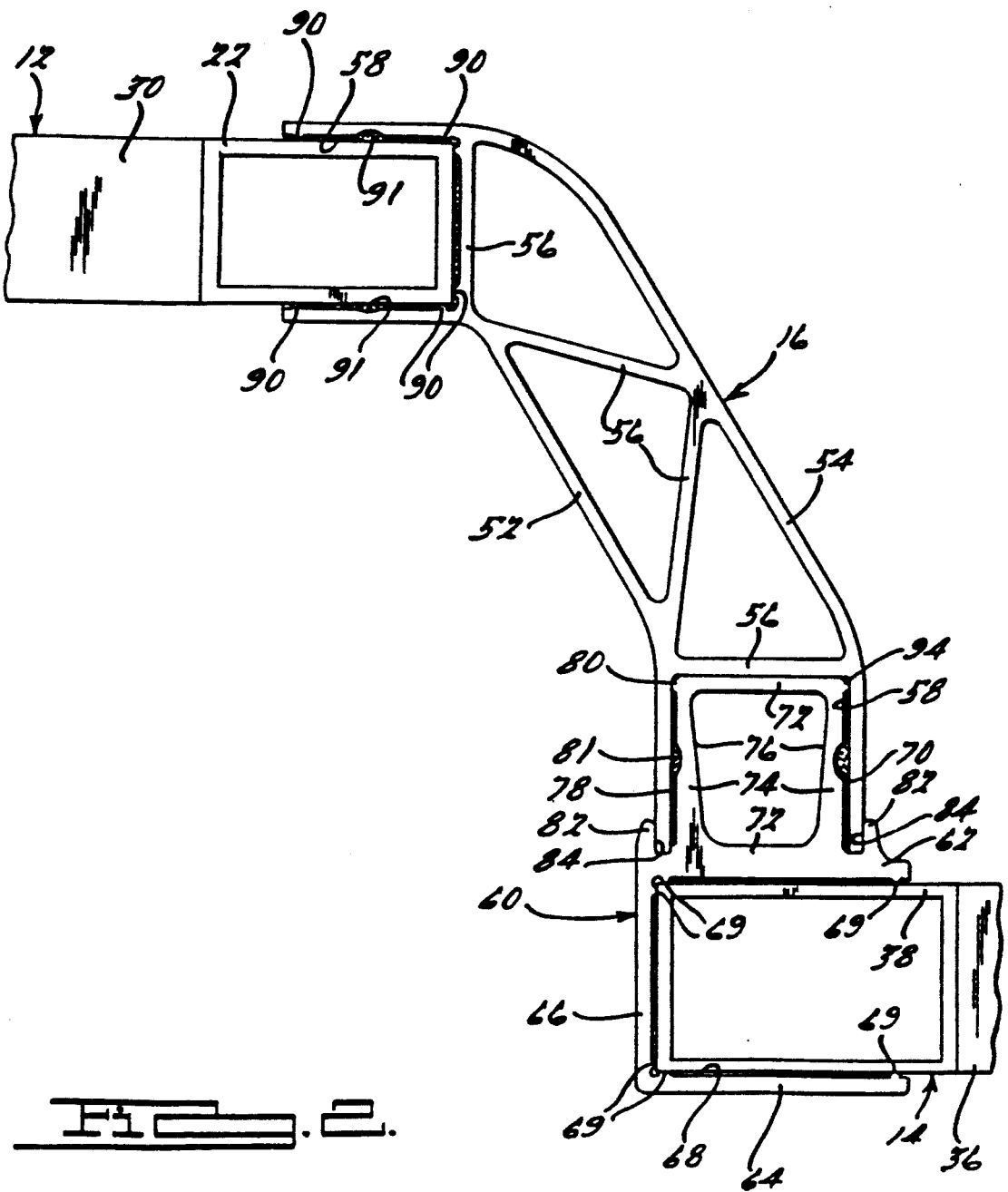

SPACE FRAME TORQUE BOX

This is a continuation of U.S. patent application Ser. No. 07/075,484, filed Aug. 29, 1992, now abandoned.

BACKGROUND OF THE INVENTION

1. Field of the Invention

The present invention relates generally to frame structures for automotive vehicles and, more specifically, to a torque box used in the construction of such frames from lightweight materials.

2. Description of the Related Art

It is known to construct frames defining the general shape of an automotive vehicle and for supporting its various load-bearing functional components from metal components fabricated in a variety of manners. In the interest of enhancing the fuel economy of automotive vehicles, great attention has been given to fabricating vehicular components from lightweight materials. Consistent with this goal, automotive vehicles have been fabricated which use lightweight outer decorative panels fabricated from plastics which are fixedly secured to a structural frame or "space frame."

It is known to fabricate such space frames from a number of tubular members that are joined by connectors to define the general shape of the vehicle. It is also known to use a torque box to provide connections between various components of the vehicle. Conventionally, the torque box is formed of two sheet metal stampings or members welded or fastened together to form a box having a hollow space. These torque boxes suffer from the disadvantage that they require subsequent processing after stamping. These torque boxes also suffer from the disadvantage that they tend to be massive and expensive to fabricate and assemble.

SUMMARY OF THE INVENTION

Accordingly, the present invention is a torque box for a space frame on an automotive vehicle having at least a pair of spaced vertically extending structural members. The torque box includes an inner panel and an outer panel spaced from the inner panel and substantially parallel thereto. The torque box also includes a plurality of interior panels extending between and interconnecting the inner and outer panels. The inner and outer panels and interior panels cooperate to form spaced ends, each of said ends adapted to be secured to the structural members.

One advantage of the present invention is that the torque box is used on a space frame of an automotive vehicle to provide a solid connection between components such as the front end and passenger compartment of the vehicle. Another advantage of the present invention is that the torque box has a truss-like construction to provide high strength/rigidity. Yet another advantage of the present invention is that the torque box is extruded from a lightweight aluminum material in a single pass, thereby eliminating subsequent processing. A further advantage of the torque box is that it is adapted to be attached to the space frame by an adhesive. A still further advantage of the present invention is that the torque box is lower in cost to fabricate and assemble in comparison to conventional torque boxes.

Other objects, features and advantages of the present invention will be readily appreciated as the same becomes better understood after reading the following description in light of the accompanying drawings.

BRIEF DESCRIPTION OF THE DRAWINGS

FIG. 2 is a plan view of the torque box assembled to a portion of the space frame of FIG. 1.

DESCRIPTION OF THE PREFERRED EMBODIMENT(S)

Figure 1:
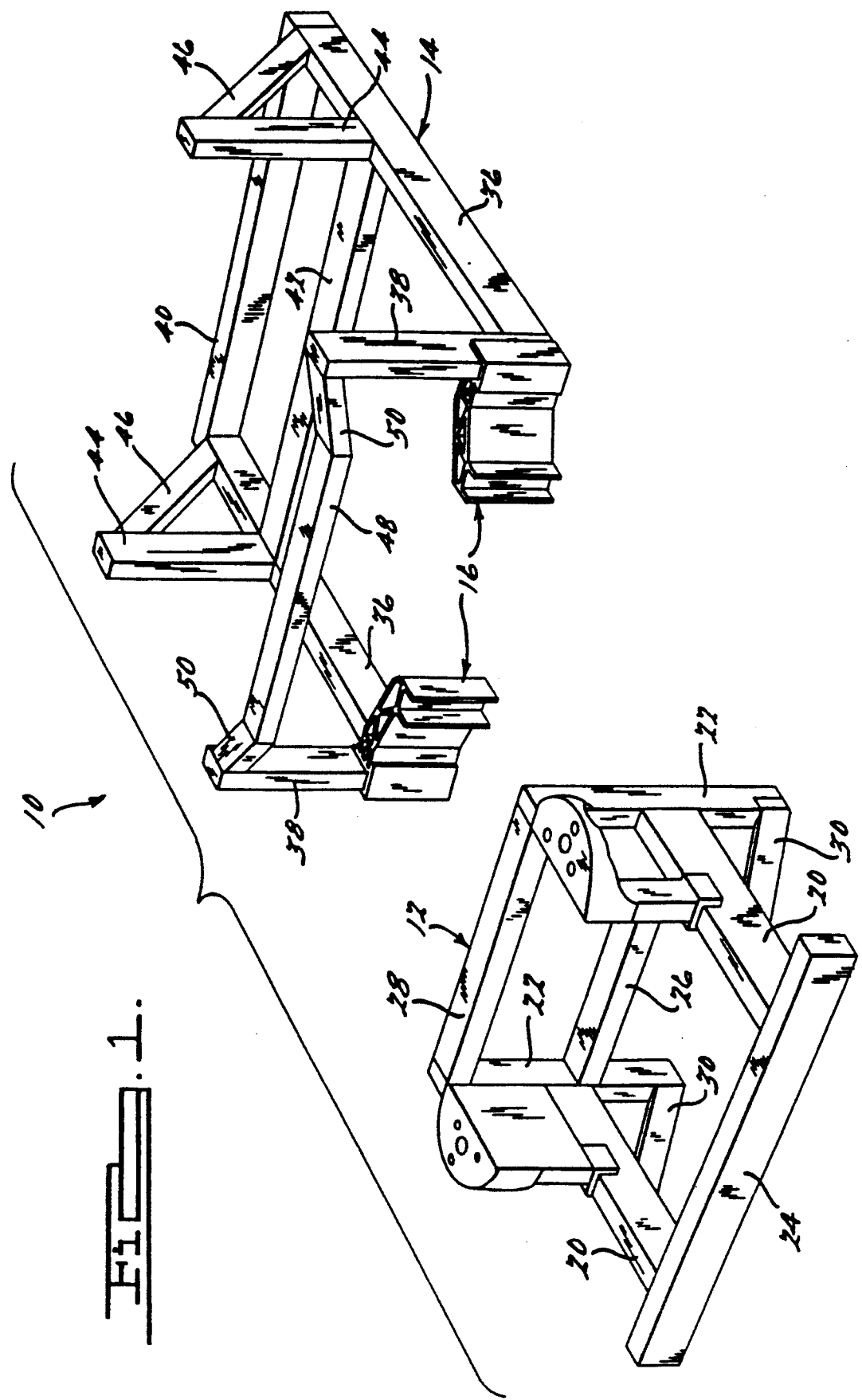
FIG. 1 is an exploded perspective view of a torque box and space frame according to the present invention.

Turning now to the drawings and in particular to FIG. 1 thereof, a space frame 10 according to the present invention is illustrated for an automotive vehicle. The space frame 10 includes a front structural subassembly, generally indicated at 12, and a passenger compartment structural subassembly, generally indicated at 14, and torque boxes, generally indicated at 16, for joining or connecting together the front and passenger compartment structural subassemblies 12, 14, respectively. The front structural subassembly 12 includes longitudinally extending side rails 20, vertically extending pillar members 22 connected to one end of the side rails 20 and a laterally extending central cross member 24 connected to the other end of the side rails 20. The front structural subassembly 12 also includes laterally extending upper and lower cross members 26, 28 respectively, interconnecting the pillar members 22. The front structural subassembly 12 further includes inclined members 30 interconnecting the side rails 20 and the pillar members 22. The front structural subassembly 12 may include other members to support an automotive engine and its associated componentry (not shown).

The passenger compartment structural subassembly 14 includes side rails 36, vertically extending pillar members 38 connected to one end of the side rails 36 and a laterally extending end cross member 40 connected to the other end of the side rails 36. The passenger compartment structural subassembly 14 also includes a central cross member 42 interconnecting the side rails 36. The passenger compartment structural subassembly 14 further includes vertically extending pillar members 44 connected to the side rails 36 adjacent the central cross member 42 and inclined members 46 interconnecting the pillar members 44 and side rails 36. The passenger compartment structural subassembly 14 includes an upper cross member 48 having inclined ends 50 connected to the ends of the pillar members 38.

The space frame 10 includes other structural members which are not labeled or specifically described to form the space frame 10 illustrated in FIG. 1. The structural members of the space frame 10 are tubular members extruded from a lightweight material such as an aluminum material. Preferably, the tubular members have a generally rectangular cross-section. It should be appreciated that other suitable lightweight materials and cross-sectional shapes may be used.

The torque box 16, according to the present invention, is adapted to connect at least a pair of spaced vertically extending structural members. For illustrative purposes, a pair of torque boxes 16 provide a connection between the front and passenger compartment structural subassemblies 12, 14, respectively. It should be appreciated that the torque box 16 may be used at other locations of the space frame 10.

Referring to FIG. 2, the torque box 16 includes an inner panel 52, and an outer panel 54 spaced from the inner panel 52 and substantially parallel thereto. The torque box 16 also includes a plurality of interior panels 56 extending between and interconnecting the inner and outer panels 52, 54, respectively. The inner and outer panels 52, 54 and interior panels 56 cooperate to form spaced ends. At least one of the interior panels 56 is orientated substantially perpendicular to the inner and outer panels 52, 54 at each end to form a channel 58 with a generally rectangular shape. The ends of the inner and outer panels 52, 54 are formed to orientate the channels 58 at an angle of about ninety degrees (90°) relative to each other. It should be appreciated that the ends of the inner and outer panels 52, 54 may be formed to orientate the channels 58 at any suitable angle relative to each other.

The remainder of the interior panels 56 are orientated at an angle relative to the inner and outer panels 52, 54 to form a truss-like configuration. The inner panel 52, outer panel 54 and interior panels 56 are integral and formed as one-piece. The torque box 16 is extruded from a lightweight material such as an aluminum material. It should be appreciated that the torque box 16 may be extruded from any suitable lightweight material.

The space frame 10 may include a connector, generally indicated at 60, for securing the ends of the torque box 16 to the pillar members 22, 38. The connector 60 includes an inner connector panel 62 and an outer connector panel 64 spaced from the inner connector panel 62 and substantially parallel thereto. The connector 60 also includes an interior connector panel 66 attached to or interconnecting the inner and outer connector panels 62, 64 at one end to form a generally rectangular shaped channel 68 defining a first dimension. The channel 68 has a width greater than the width of the pillar member 38 and is adapted to receive the pillar member 38. The connector 60 may also include a plurality of projections 69 formed on interior surfaces of the inner and outer connector panels 62, 64 and interior connector panel 66 for a function to be described.

The connector 60 includes at least one extension member 70 attached to the inner connector panel 62 and extending outwardly therefrom to define a second dimension relative to the first dimension. The extension member 70 is disposed within the channel 58 of the torque box 16 to connect the torque box 16 to the pillar member 38. It should be appreciated that the extension member 70 may also be attached to the outer panel 64 and/or connector panel 66.

The extension member 70 has end walls 72 and side walls 74 to form a generally rectangular and tubular shape. Interior surfaces 76 of the side walls 74 may be tapered to provide various wall thicknesses for structural strength. Outer surfaces 78 of the side walls 74 may include at least one projection 80 extending outwardly and adapted to engage interior surfaces of the inner and outer panels 52, 54 for a function to be described. The side walls 74 may include a groove 81 extending inwardly from the outer surface 72. The groove 81 has a generally arcuate shape and is adapted for an adhesive to be described.

The connector 60 may include a flange 82 extending outwardly from the inner connector panel 62 and substantially parallel to the side walls 74 of the extension member 70. The flange 82 is spaced laterally from the side walls 74 on both sides of the extension member 70 to form a space 84 therebetween. The space 84 is adapted to receive the inner and outer panels 52, 54 of the torque box 16. It should be appreciated that a connector 60 may be used at both ends of the torque box 16 to connect the front structural subassembly 12 to the passenger compartment structural subassembly 14.

Alternatively, instead of using the connectors 60, the ends of the torque box 16 may include a plurality of projections 90 on the interior surfaces of the inner panel 52, outer panel 54, and interior panel 56 forming the channel 58. The projections 90 extend outwardly and are adapted to engage the pillar member 22 for a function to be described. The inner and outer panels 52, 54 may include a groove 91 extending inwardly from interior surfaces thereof. The groove 91 has a generally arcuate shape and is adapted for an adhesive to be described. It should be appreciated that one or both connectors 60 may be eliminated and the ends of the torque box 16 secured directly to the pillar members 22, 38.

In operation, the connector 60 is formed as one-piece and extruded from a lightweight material such as an aluminum material. The side walls 74 may be trimmed to form a chamfer 94 at the corner thereof. To assemble, the connector 60 is disposed on the pillar member 38 such that the pillar member 38 is received in the channel 68. The torque box 16 is disposed over the extension member 70 until the end abuts the inner connector panel 62 of the connector 60. The chamfer 94 allows the extension member 70 to fit easily inside the channel 58 and the projections 80 engage the interior surfaces of the inner and outer panels 52, 54. An aperture (not shown) may be formed by drilling, for example, to extend through either of the inner and outer panels 52, 54 of the torque box 16 or either of the inner, outer, interior connector panels 62, 64, 66 of the connector 60. A device such as a robot injects an adhesive through the apertures. Preferably, the adhesive is a structural adhesive such as an acrylic adhesive. An example of such an acrylic adhesive is found under the trade name Versilok acrylic adhesive (AD5830) of the Lord Corporation. It should be appreciated that other suitable adhesives may be used.

The adhesive flows in the space between the extension member 70 and inner and outer panels 52 and 54 of the torque box 16 and between the connector panels 62, 64, 66 and the pillar member 38. The adhesive is contained or limited by the projections 69 and 80. It should be appreciated that the groove 81 may act as a distribution channel for the adhesive or act as an overflow if excess adhesive is used. It should be appreciated that the connector panels 62, 64, 66 may also include a groove (not shown) for the adhesive.

Alternatively, if the connectors 60 are not used, to assemble, the ends of the torque box 16 are disposed over the pillar members 22, 38 such that the pillar members 22, 38 are received in the channels 58. An aperture (not shown) may be formed by drilling, for example, to extend through either of the inner and outer panels 52, 54 at the ends thereof and a device such as a robot injects adhesive through the apertures. The adhesive flows in the space between the pillar members 22, 38 and the inner and outer panels 52, 54. The adhesive is contained or limited by the projections 90. It should be appreciated that the adhesive may flow along the groove 91 to distribute adhesive along the entire length of the joint.

Accordingly, the adhesive acts as the primary bonding agent to secure the extruded aluminum torque box 16 and/or connectors 60 to the extruded aluminum structural members in the space frame 10. The flanges 82 act as a reaction member to provide additional strength and support if connectors 60 are used.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A torque box for a space frame on an automotive vehicle having at least a pair of spaced vertically extending structural members, comprising:
    an inner panel;
    an outer panel spaced from said inner panel and substantially parallel thereto;
    a plurality of interior panels extending between and interconnecting said inner and outer panels;
    said inner and outer panels and said interior panels cooperating to form spaced ends, each of said ends adapted to be secured to the structural members;
    said inner and outer panels and said interior panels cooperating to form a channel at each end;
    wherein at least one of said interior panels is orientated substantially perpendicular to said inner and outer panel at each end to form said channel; and
    wherein at least two of a remainder of said interior panels are orientated at an angle relative to said inner and outer panel and to each other to form a triangulated truss-like configuration.

2. A torque box as set forth in claim 1 wherein said inner panel, said outer panel and said interior panels are integral.

3. A torque box as set forth in claim 1 wherein said inner panel, said outer panel and said interior panels are formed as one-piece.

4. A torque box as set forth in claim 1 wherein said torque box is extruded.

5. A torque box as set forth in claim 1 wherein said torque box is extruded from an aluminum material.

6. A torque box as set forth in claim 1 wherein said channels are orientated at an angle of about 90 degrees relative to each other.

7. A space frame for an automotive vehicle comprising:
    at least a pair of spaced vertically extending structural members;
    a torque box having spaced ends secured to said structural members;
    said torque box comprising an inner panel, an outer panel spaced from said inner panel and substantially parallel thereto, and a plurality of interior panels extending between and interconnecting said inner and outer panels;
    said inner and outer panels and said interior panels cooperating to form a channel at each end; and
    wherein one of said interior panels is orientated substantially perpendicular to said inner and outer panel at each end to form said channel; and
    wherein at least two of a remainder of said interior panels are oriented at an angle relative to said inner and outer panel and to each other to form a triangulated truss-like configuration.

8. A space frame as set forth in claim 7 wherein said channels are orientated at an angle of about 90 degrees relative to each other.

9. A torque box as set forth in claim 7 including means for securing said ends of said torque box to said structural members.

10. A space frame as set forth in claim 9 wherein said securing means comprises an adhesive disposed between said channel and said structural member.

11. A space frame as set forth in claim 9 including at least one connector adapted to be received in said channel and adapted to be secured to one of said structural members.

12. A space frame as set forth in claim 11 wherein said securing means includes an adhesive disposed between said connector and said structural member.

13. A space frame as set forth in claim 12 wherein said torque box is extruded as one-piece from an aluminum material.

14. A space frame for an automotive vehicle comprising:
    at least a pair of spaced vertically extending extruded structural members;
    a torque box having spaced ends secured to said extruded structural members;
    said torque box comprising an inner panel, an outer panel spaced from said inner panel and substantially parallel thereto, and a plurality of interior panels extending between and interconnecting said inner and outer panels;
    one of said interior panels is orientated substantially perpendicular to said inner and outer panel at each end to form a channel and at least two of a remainder of said interior panels are disposed therebetween and orientated at an angle to said inner and outer panel and to each other to form a triangulated truss-like configuration;
    at least one connector secured to one of the ends of said torque box and to one of said extruded structural members; and
    an adhesive disposed between said connector and said extruded structural member and said torque box.

* * * * *